United States Patent
Liang et al.

(10) Patent No.: US 12,525,616 B2
(45) Date of Patent: Jan. 13, 2026

(54) POSITIVE CURRENT COLLECTOR, POSITIVE ELECTRODE PLATE, SECONDARY BATTERY, AND APPARATUS

(71) Applicant: Contemporary Amperex Technology Co., Limited, Ningde (CN)

(72) Inventors: Chengdu Liang, Ningde (CN); Shiwen Wang, Ningde (CN); Qisen Huang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 902 days.

(21) Appl. No.: 17/512,706

(22) Filed: Oct. 28, 2021

(65) Prior Publication Data
US 2022/0052346 A1 Feb. 17, 2022

Related U.S. Application Data

(63) Continuation of application No. PCT/CN2019/124826, filed on Dec. 12, 2019.

(30) Foreign Application Priority Data

Apr. 28, 2019 (CN) .......................... 201910351219.9

(51) Int. Cl.
*H01M 4/66* (2006.01)
(52) U.S. Cl.
CPC ............ *H01M 4/662* (2013.01); *H01M 4/663* (2013.01); *H01M 4/667* (2013.01)
(58) Field of Classification Search
CPC ...... H01M 4/661; H01M 4/662; H01M 4/663; H01M 4/667
(Continued)

(56) References Cited

U.S. PATENT DOCUMENTS

2003/0054255 A1 3/2003 Hidaka et al.
2004/0126663 A1* 7/2004 Sudano ............... H01M 10/052
429/234

(Continued)

FOREIGN PATENT DOCUMENTS

CN 102569817 A 7/2012
CN 102891323 A 1/2013
(Continued)

OTHER PUBLICATIONS

The First Office Action for Chinese Application No. 201910351219.9, dated Aug. 28, 2020, 6 pages.
(Continued)

*Primary Examiner* — Niki Bakhtiari
*Assistant Examiner* — Omar M Kekia
(74) *Attorney, Agent, or Firm* — East IP P.C.

(57) ABSTRACT

A positive current collector, a positive electrode plate, a secondary battery, and an apparatus, the positive current collector comprising a support layer, provided with two opposing surfaces in the thickness direction thereof, and a conductive layer arranged on at least one of the two surfaces of the support layer, wherein the conductive layer has a thickness $D_1$ satisfying 300 nm≤$D_1$≤2 μm; and when the positive current collector has a the tensile strain of 1.5%, the conductive layer has a sheet resistance growth rate of T≤30%. The positive current collector has higher safety performance and meanwhile higher electrical performance, and thus a positive electrode plate and a secondary battery adopting the positive current collector could have higher safety performance and meanwhile higher electro-chemical performance.

16 Claims, 5 Drawing Sheets

(58) Field of Classification Search
USPC .......................................................... 429/209
See application file for complete search history.

(56) References Cited

U.S. PATENT DOCUMENTS

| | | | |
|---|---|---|---|
| 2013/0314844 A1 | 11/2013 | Chen et al. | |
| 2018/0198132 A1 | 7/2018 | Liang et al. | |
| 2019/0131080 A1* | 5/2019 | Kawaguchi | H01M 4/66 |
| 2019/0173089 A1* | 6/2019 | Liang | H01M 4/661 |
| 2020/0044258 A1* | 2/2020 | Yan | H01M 4/667 |

FOREIGN PATENT DOCUMENTS

| | | | |
|---|---|---|---|
| CN | 103119774 A | 5/2013 | |
| CN | 103326029 A | 9/2013 | |
| CN | 103855346 A | 6/2014 | |
| CN | 103903870 A | 7/2014 | |
| CN | 104313386 A | 1/2015 | |
| CN | 104466093 A | 3/2015 | |
| CN | 106654285 A | 5/2017 | |
| CN | 106898729 A | 6/2017 | |
| CN | 106910897 A | 6/2017 | |
| CN | 107123812 A | 9/2017 | |
| CN | 206878100 U | 1/2018 | |
| CN | 108155387 A | 6/2018 | |
| CN | 108281662 A | 7/2018 | |
| CN | 108832134 A | 11/2018 | |
| CN | 109088071 A | 12/2018 | |
| CN | 208336378 U | 1/2019 | |
| CN | 111180736 A | 5/2020 | |
| EP | 1551070 A1 | 7/2005 | |
| EP | 3367485 A1 | 8/2018 | |
| EP | 3389122 A1 | 10/2018 | |
| JP | 2008192364 A | 8/2008 | |
| WO | 2012117627 A1 | 9/2012 | |

OTHER PUBLICATIONS

The First Office Action for Chinese Division Application No. 202011215671.1, dated Jul. 5, 2021, 8 pages.
The International search report for PCT Application No. PCT/CN2019/124826, dated Mar. 13, 2020, 18 pages.
The Notice of Allowance for Chinese Application No. 202011215671.1, dated Mar. 21, 2022, 6 pages.
The EESR for European Application No. 19927199.0, dated Apr. 22, 2022, 8 pages.
The First Office Action for Indian Application No. 202117053976, dated May 2, 2022, 6 pages.
The First Office Action for China Application No. 201910351364.7, dated Aug. 26, 2020, 10 pages.
The notice to grant patent for China Application No. 201910351364.7, dated Oct. 12, 2020, 6 pages.
The extended European search report for EP Application No. 19927079.4, dated Jun. 2, 2022, 54 pages.
The International search report for PCT Application No. PCT/CN2019/124825, dated Mar. 13, 2020, 12 pages.
Chaoqun Li et al., Research progress in current collecting material for alkaline nickel battery, Feb. 28, 2007(Feb. 28, 2007) , the first issue.,pp. 57-59, 3 pages.
Jihai Zhang et al., Polypropylene elastomer composite for the all-vanadium redox flow battery:current collector material ,Aug. 31, 2009(Aug. 31, 2009) , the fifth issue,vol. 3,pp. 2387-2398,15 pages.

* cited by examiner

POSITIVE CURRENT COLLECTOR, POSITIVE ELECTRODE PLATE, SECONDARY BATTERY, AND APPARATUS

CROSS-REFERENCE TO RELATED APPLICATION

This application is a continuation of International Application No. PCT/CN2019/124826, filed on Dec. 12, 2019, which claims priority to Chinese Patent Application No. 201910351219.9, filed on Apr. 28, 2019, both of which are incorporated herein by reference in their entireties.

TECHNICAL FIELD

This application belongs to the technical field of electrochemical devices, and specifically relates to a positive current collector, a positive electrode plate, a secondary battery and an apparatus.

BACKGROUND

Secondary batteries represented by lithium ion secondary batteries are widely used in electric vehicles and consumer electronic products due to their advantages of high energy density, high output power, long cycle life and low environmental pollution. However, the secondary batteries, when undergoing abnormal conditions such as nail penetration, are liable to be short circuited. In the case of short circuit, a large current together with a large amount of short circuit heat would be generated in the battery, which is likely to cause smoking, igniting, or even exploding of batteries. This would lead to a big safety risk. Therefore, an urgent technical problem to be solved is how to improve safety performance of secondary batteries.

SUMMARY OF THE INVENTION

A first aspect of the present application provides a positive current collector including a support layer having two surfaces opposite to each other in its thickness direction; and a conductive layer arranged on at least one of the two surfaces of the support layer; wherein, the conductive layer has a thickness D1 satisfying 300 nm≤D1≤2 µm, preferably 500 nm≤$D_1$≤1.5 µm; and when the positive current collector has a tensile strain of 1.5%, the conductive layer has a sheet resistance growth rate of T≤30%, preferably of T≤15%, and more preferably of T≤5%.

A second aspect of the present invention provides a positive electrode plate including a positive current collector and a positive active material layer arranged on the positive current collector, wherein the positive current collector is the positive current collector according to the first aspect of the present invention.

A third aspect of the present invention provides a secondary battery including a positive electrode plate, a negative electrode plate, a separator and an electrolyte, wherein the positive electrode plate is the positive electrode plate according to the second aspect of the present invention.

A fourth aspect of the present invention provides an apparatus including the secondary battery according to the third aspect of the present invention.

The positive current collector provided in the present application includes a conductive layer having a smaller thickness which is arranged on at least one surface of the support layer. When the secondary battery adopting said positive current collector undergoes abnormal conditions such as nail penetration, burrs generated on the conductive layer would be greatly reduced as compared with the existing metal current collector, thereby reducing the probability that the burrs on the conductive layer pierce separator to contact with the counter electrode. As a result, the risk of internal short circuit in the secondary battery is significantly reduced. Moreover, in the positive current collector, the support layer has a resistivity greater than that of the conductive layer. Accordingly, the secondary battery would have a larger short-circuit resistance when an internal short-circuit occurs. Hence, short-circuit current and thus short-circuit heat generation are reduced, and further, the nail penetration safety performance of the secondary battery is improved. In addition, when the positive current collector has a tensile strain of 1.5%, the conductive layer has a sheet resistance growth rate T≤30%. In this instance, the resistance resulted from tensile deformation of the conductive layer having a smaller thickness would be prevented from increasing sharply, so that the positive current collector could maintain good electrical conductivity and current collecting performance during further processing and during using in secondary batteries. The positive current collector or positive electrode plate of the present application allow the secondary battery adopting the same have low impedance and low polarization, so that the secondary battery additionally has higher electrochemical performance.

The conductive layer having a reduced thickness is also beneficial to reducing the weight of the positive current collector or the positive electrode plate, so as to increase the weight energy density of the secondary battery.

Therefore, by adopting the positive current collector or the positive electrode of the present application, the secondary battery provided in the present application could have higher safety performance and simultaneously have higher electrochemical performance. The apparatus of the present application includes the secondary battery provided in the present application, and thus at least has advantages identical to those of the secondary battery.

DESCRIPTION OF THE DRAWINGS

In order to explain the technical solutions of the embodiments of the present application more clearly, the drawings for embodiments of the present application will be briefly described below. A person of ordinary skill in the art can obtain other drawings based on the drawings without a creative work.

DETAILED DESCRIPTION

In order to explain the object, technical solution, and technical effects of the present application apparent more clearly, hereinbelow the present application will be further described in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form range that is not explicitly described. Likewise, any upper limit may be combined with any other upper limit to form a range that is not explicitly described. Further, although not explicitly specified, each point or single value between the endpoints of the range is included in the range. Thus, each point or single value, as its own lower limit or upper limit, can be combined with any other point or single value or combined with other lower limit or upper limit to form a range that is not explicitly specified.

In the description herein, it should be noted that, unless otherwise stated, the recitation of numerical ranges by "no less than" and "no more than" include all numbers within that range including the endpoints. As used herein, the recitation of "more" in the phrase "one or more" means two or more.

The above-stated summary of the present application is not intended to describe each and every embodiment or implementation disclosed in this application. The following description illustrates exemplary embodiments more specifically. In many places throughout the application, guidance is provided by means of a series of embodiments, which can be applied in various combinations. In each instance, the enumeration is only a representative group and should not be interpreted as exhaustive.

Positive Current Collector

The first aspect of the present application provides a positive current collector, which, compared with the traditional positive current collector of metal aluminum foil, may have higher safety performance and simultaneously have electrical performance.

Figure 1:
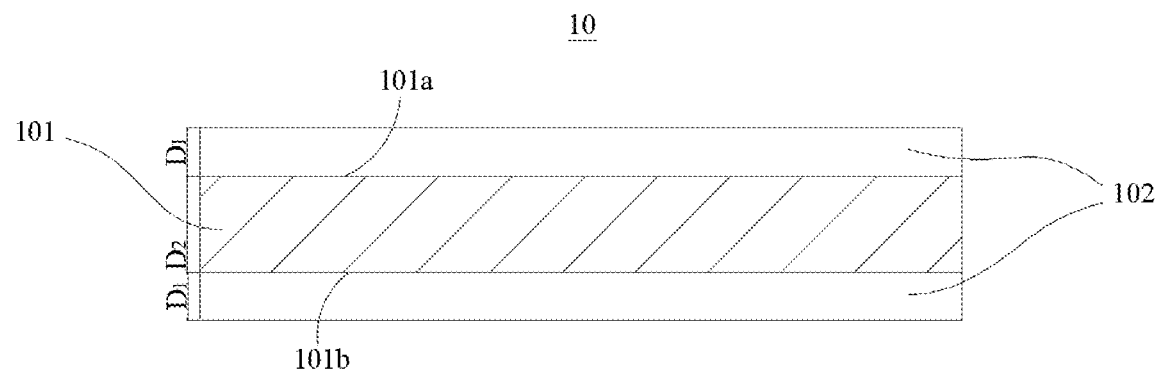
FIG. 1 shows a schematic diagram of the structure of a positive current collector provided in one embodiment of the present application.

FIG. 1 schematically shows a positive current collector 10 as an example. As shown in FIG. 1, the positive current collector 10 includes laminated support layer 101 and conductive layer 102, wherein the support layer 101 has a first surface 101a and a second surface 101b opposite to each other in its thickness direction, and the conductive layer 102 is laminated on the first surface 101a and the second surface 101b of the support layer 101.

Figure 2:
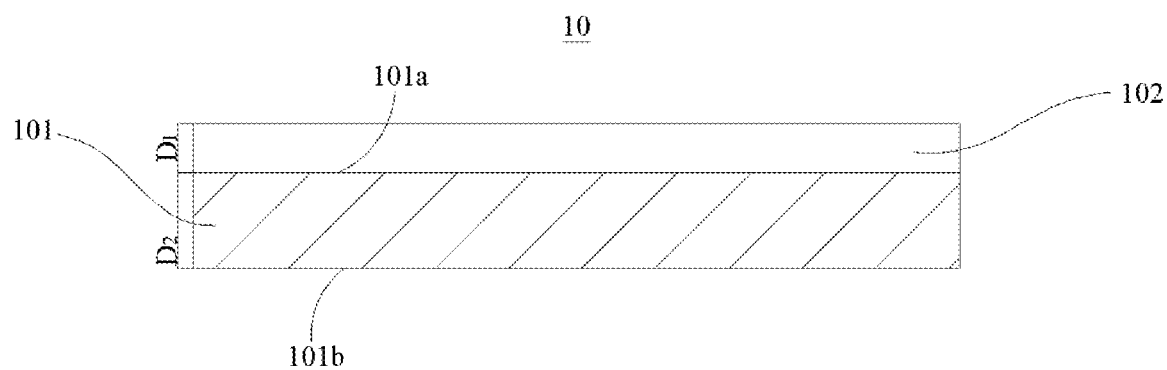
FIG. 2 shows a schematic diagram of the structure of a positive current collector provided in another embodiment of the present application.

FIG. 2 schematically shows a positive current collector 10 as another example. As shown in FIG. 2, the positive current collector 10 includes laminated support layer 101 and conductive layer 102, wherein the support layer 101 has a first surface 101a and a second surface 101b opposite to each other in its thickness direction, and the conductive layer 102 is laminated on the first surface 101a of the support layer 101. Of course, the conductive layer 102 may also be laminated on the second surface 101b of the support layer 101.

In the positive current collector 10 of the present application, the conductive layer 102 has a thickness $D_1$ satisfying 300 nm≤$D_1$≤2 μm, and when the positive current collector has a tensile strain of 1.5%, the conductive layer has a sheet resistance growth rate of T≤30%

In the positive current collector 10 of the present application, a conductive layer 102 having a smaller thickness is arranged on at least one surface of the support layer 101. When the secondary battery adopting said positive current collector 10 undergoes abnormal conditions such as nail penetration, burrs generated on the conductive layer 102 would be greatly reduced as compared with the existing metal current collector, thereby reducing the probability that the burrs on the conductive layer 102 pierce separator to contact with the counter electrode. As a result, the risk of internal short circuit in the secondary battery is significantly reduced. Moreover, in the positive current collector 10, the support layer 101 has a resistivity greater than that of the conductive layer 102. Accordingly, the secondary battery would have a larger short-circuit resistance when an internal short-circuit occurs. Hence, short-circuit current and thus short-circuit heat generation are reduced, and further, the nail penetration safety performance of the secondary battery is improved.

The conductive layer 102, having a thickness $D_1$ within an appropriate range, is not likely to break, so as to ensure that the positive current collector 10 has good conductivity and current collection performance. In addition, the positive current collector 10 is often subjected to stretching, for example in the case that the positive electrode plate is rolled during the processing of the positive electrode plate or expands during application in the secondary battery, thereby resulting in a tensile strain. When the positive current collector 10 has a tensile strain of 1.5%, the conductive layer 102 has a sheet resistance growth rate T of ≤30%. In this instance, the resistance resulted from tensile deformation of the conductive layer 102 having a smaller thickness may be effectively prevented from increasing sharply, so that the positive current collector 10 could maintain good electrical conductivity and current collecting performance during further processing and application in secondary batteries. By adopting the positive current collector 10, the secondary batteries would have low impedance and low polarization, so that the secondary batteries have higher electrochemical performance together with higher rate performance and cycle performance.

The conductive layer 102 having a substantially reduced thickness is advantageous to reduction of the weight of the positive current collector 10 or the positive electrode plate, so as to significantly increase the weight energy density of the secondary battery.

Therefore, by adopting the positive current collector 10 according to embodiments of the present application, the secondary batteries could have high safety performance and simultaneously higher electrochemical performance.

Furthermore, when the positive current collector 10 has a tensile strain E of 1.5%, the conductive layer 102 has a sheet resistance growth rate T of ≤15%. Furthermore, when the positive current collector 10 has a tensile strain E of 1.5%, the conductive layer 102 has a sheet resistance growth rate T of ≤5%.

In embodiments herein, the tensile strain E of the positive current collector 10 may be calculated according to formula ε=ΔL/L×100%, where ΔL is the elongation of the positive current collector 10 when being subjected to stretching, and L is the original length of the positive current collector 10, i.e. the length of the positive current collector 10 before being subjected to stretching.

When the positive current collector 10 has a tensile strain of 1.5%, the sheet resistance growth rate T of the conductive layer 102 may be measured by a method well known in the art. As an example, the measurement comprise cutting the positive current collector 10 into a sample of 20 mm×200 mm, measuring the sheet resistance of the central area of the sample by means of a four-probe method, recorded as $R_1$; then subjecting the central area of the sample to stretching on a tensile tester, where an initial position is set, the center area of the sample with a length of 50 mm is clamped between clamps and is subjected to stretching at a speed of 50 mm/min, and then the stretching stops when the tensile distance is 1.5% of the original length of the sample, that is, the tensile distance reaches 0.75 mm; taking off the sample after stretching to measure the sheet resistance of the conductive layer 102 in the central area of the stretched sample, recorded as $R_2$; and calculating the sheet resistance growth rate T of the conductive layer 102 when the positive current collector 10 has a tensile strain of 1.5% according to formula T=($R_2$−$R_1$)/$R_1$×100%. The tensile tester may be an Instron 3365 tensile tester available from Instron, USA.

An exemplary method for measuring the sheet resistance of the sample by means of a four-probe method is as follows: using RTS-9 double-electric four-probe tester, the test is conducted at a temperature of 23±2° C. under 0.1 MPa, with a relative humidity of ≤65%. The test is performed by cleaning the surface of the sample, then placing it horizontally on the test bench; putting down the four probes so that the probes are in good contact with the surface of the sample; then calibrating the current range of the sample under automatic test mode, so as to measure the sheet resistance under a suitable current range; collecting 8 to 10 data points of the same sample for analyzing the accuracy and error of the measuring data; and taking the average value, which is recorded as the sheet resistance value of the sample.

In some embodiments, the support layer 101 has a thickness $D_2$ satisfying 1 μm≤$D_2$≤20 μm. For example, the support layer 101 may have a thickness $D_2$ of 20 μm or less, 18 μm or less, 15 μm or less, 12 μm or less, 10 μm or less, or 8 μm or less, and may have a thickness $D_2$ of 1 μm or more, 1.5 μm or more, 2 μm or more, 3 μm or more, 4 μm or more, 5 μm or more, 6 μm or more, 7 μm or more. Preferably, 1 μm≤$D_2$≤15 μm. Preferably, 2 μm≤D2≤10 μm, and more preferably, 2 μm≤$D_2$≤6 μm.

The thickness $D_2$ of the support layer 101 is suitable for allowing the support layer 101 have sufficient mechanical strength so that it is not likely to break during processing and application, and could well protect and support the conductive layer 102, thereby ensuring good mechanical stability and operating stability of the positive current collector 10, and further resulting in relatively long service life of the positive current collector 10. The support layer 101 having the appropriate thickness is also advantageous to allow the secondary battery have smaller volume and weight, so as to increase the energy density of the secondary battery.

In some preferred embodiments, the support layer 101 has a volume resistivity of greater than or equal to $1.0 \times 10^{-5}$ Ω·m. Since the support layer 101 has a large volume resistivity, in the case of abnormal conditions such as nail penetration of the secondary battery, the short-circuit resistance would increase when an internal short circuit occurs in the secondary battery. Accordingly, the nail penetration safety performance of the secondary battery is improved. The support layer 101 is preferably a support layer having insulating properties.

In embodiments herein, the volume resistivity of the support layer 101 is the volume resistivity at a temperature of 20° C., which can be measured by methods well known in the art. As an example, the measurement is conducted under conditions of constant temperature, normal pressure and low humidity (20 C, 0.1 MPa, RH≤20%), a sample of support layer 101 is prepared to be a round sheet having a diameter of 20 mm (the sample size could be adjusted according to the actual size of the test instrument), and the measurement is conducted by means of a three-electrode surface resistivity method according to GB T 1410-2006 on an insulation resistance tester with a precision of 10Ω. The measuring method is as follows: placing the sample of round sheet between two electrodes, and applying a potential difference between the two electrodes, wherein the current as generated will distribute in the sample of round sheet and is measured by a picoammeter or electrometer, so as to avoid the measurement error due to introduction of the surface leakage current into the measurement. The reading is the volume resistivity in Ω·m.

In some embodiments, preferably, the support layer 101 has an elongation at break that is greater than or equal to that of the conductive layer 102. In this way, when the secondary batter undergoes abnormal conditions such as nail penetration, the burrs on the support layer 101 can cover those on the conductive layer 102 and thus cover the surface of the nail so as to prevent the burrs of the conductive layer 102 from being in direct contact with the counter electrode. Thus, the internal short circuit in the secondary battery is suppressed. In addition, since the support layer 101 has a large volume resistivity, when an internal short circuit occurs in the secondary battery, the short-circuit resistance would be significantly increased, and thus short-circuit current and short-circuit heat generation are significantly reduced. Accordingly, the nail penetration safety performance of the secondary battery is improved.

Preferably, the support layer 101 has an elongation at break that is higher than that of the conductive layer 102. Since the conductive layer 102 has a relatively small ductility and the support layer 101 has a relatively large ductility, when the secondary battery undergoes abnormal conditions such as nail penetration, the conductive layer 102 is stretched, and at the same time the support layer 101 covers the surface of the nail so that the nail is isolated from the conductive layer 102. As a result, the local conductive network is cut-off, thereby inhibiting short-circuit on a large area of the secondary battery or even on the entire secondary battery. As such, damages of the secondary battery such as caused by nail penetration could be limited to the penetration site, only resulting in "Point Break", without affecting the normal operation of the secondary battery within a certain period of time.

Optionally, the support layer 101 has an elongation at break of greater than or equal to 5%. Further, the support layer 101 has an elongation at break of greater than or equal to 10%.

The elongation at break may be determined using methods well known in the art. As an example, the method comprises cutting the support layer 101 into a sample of 15 mm×200 mm; conducting a tensile test on a tensile tester under normal temperature and pressure (25° C., 0.1 MPa), where an initial position is set so that the sample length between the clamps is 50 mm, and the tensile speed is 50 mm/min; recording the displacement y (mm) of the instrument at the time of breaking due to stretching; and finally calculating the elongation at break according to (y/50)× 100%. The tensile tester may be an Instron 3365 tensile tester available from Instron, USA. The elongation at break of the conductive layer 102 may be measured likewise.

In some embodiments, preferably, the support layer 101 has a Young's modulus E of ≥4 GPa. The support layer 101 has rigidity, and thus could support the conductive layer 102, thereby ensuring the overall strength of the positive current collector 10. During the processing of the positive current collector 10, the support layer 101 would not be excessively stretched or deformed, and thus the support layer 101 and the conductive layer 102 are prevented from breakage; at the same time, it would be helpful to increase the binging strength between the support layer 101 and the conductive layer 102 without detaching from each other. Therefore, the positive current collector 10 could have higher mechanical stability and operating stability, so that the secondary battery could have higher electrochemical performance, such as longer cycle life.

More preferably, the support layer 101 has a Young's modulus E satisfying 4 GPa≤E≤20 GPa. This allows the support layer 101 have rigidity together with a certain ability to withstand deformation. As a result, the positive current collector 10 have a flexibility during wounding and application, and is prevented from breakage.

The Young's modulus E of the support layer 101 may be measured by a method well known in the art. As an example, the method comprises cutting the support layer 101 into a sample of 15 mm×200 mm and measuring the thickness h (μm) of the sample with a high-qualified micrometer; conducting a tensile test on a tensile test under normal temperature and pressure (25° C., 0.1 MPa), where an initial position is set so that the sample length between the clamps is 50 mm, and the tensile speed is 50 mm/min; recording the load L(N) at which break occurs due to stretching, and the displacement y(mm) of the instrument; plotting a stress-strain curve on the basis of stress ε(GPa)=L/(15×h) and strain η=y/50, and taking the curve of the initial linear region to determine the slope of this curve, i.e. Young's modulus E. The tensile tester may be an Instron 3365 tensile tester available from Instron, USA.

In some embodiments, the binding force between the support layer 101 and the conductive layer 102 may be F≥100 N/m, preferably F≥400 N/m. The support layer 101 and the conductive layer 102 are firmly bonded, so that the support layer 101 may effectively support the conductive layer 102, and that the burrs of the support layer 101 could cover the burrs of the conductive layer 102 more fully during nail penetration. As a result, the nail penetration safety performance of the secondary battery is improved.

The binding force F between the support layer 101 and the conductive layer 102 can be tested by a method known in the art. For example, the method comprises taking a positive current collector 10 where a conductive layer 102 is arranged on one side of the support layer 101 as a test sample with a width d of 0.02 m; sticking a 3 M double-sided tape evenly on a stainless steel plate, and then sticking the test sample evenly on the double double-sided tape, with the positive current collector 10 being bonded to the double-sided tape; peeling the conductive layer 102 from the support layer 101 of the test sample continuously at a speed of 50 mm/min under normal temperature and pressure (25° C., 0.1 MPa) at an angle of 180°; reading the maximum tensile force x (N) on the data diagram of tensile force vs. displacement, and calculating the binding force F (N/m) between the conductive layer 102 and the support layer 101 according to the formula F=x/d. The tensile tester may be an Instron 3365 tensile tester available from Instron, USA.

In some embodiments, the support layer 101 may adopt one or more of polymer materials and polymer-based composite materials. Since polymers and polymer-based composites have a density that is significantly lower than that of metals, the positive current collector 10 could have a significantly reduced weight as compared with the existing metal current collectors. As a result, the weight energy density of the secondary battery is increased.

The polymers are, for example, one or more selected from polyamides, polyimides, polyesters, polyolefins, polyalkynes, siloxane polymers, polyethers, polyols, polysulfones, polysaccharide polymers, amino acid polymers, poly(sulphur nitride), aromatic ring polymers, aromatic heterocyclic polymers, epoxy resins, phenolic resins, and the derivatives, cross-linked products and copolymers thereof.

Polyamide polymers are for example polycaprolactam (commonly known as nylon 6), polyhexamethylene adipamide (commonly known as nylon 66), poly-p-phenylene terephthamide (PPTA), and poly-m-phenylene isophthalamide (PMIA); polyester polymers are for example polyethylene terephthalate (PET), polybutylene terephthalate (PBT), polyethylene naphthalate (PEN), and polycarbonate (PC); polyolefin polymers are for example polyethylene (PE), polypropylene (PP), poly-propylene-ethylene (PPE); derivatives of polyolefin polymers are such as polyvinyl alcohol (PVA), polystyrene (PS), polyvinyl chloride (PVC), polyvinylidene fluoride (PVDF), polytetrafluoroethylene (PTEE), and poly(sodium-p-styrenesulfonate) (PSS); polyalkyne polymers are for example polyacetylene (PA); the siloxane polymers are for example silicone rubber; polyether polymers are for example polyoxymethylene (POM), polyphenylene oxide (PPO), and polyphenylene sulfide (PPS); polyol polymers are for example polyethylene glycol (PEG); polysaccharide polymers are for example cellulose and starch; amino acid polymers are for example proteins; aromatic ring polymers are for example polyphenyl and polyparaphenylene; aromatic heterocyclic polymers are for example polypyrrole (PPy), polyaniline (PAN), polythiophene (PT), and polypyridine (PPY); a copolymer of polyolefin polymers and the derivatives thereof is for example acrylonitrile-butadiene-styrene copolymer (ABS).

The polymer-based composites may include one or more additives of the above-mentioned polymers. Additives can adjust the volume resistivity, elongation at break, and Young's modulus of the polymers.

The additives may include one or more of metallic materials and inorganic non-metallic materials. The metal materials are, for example, one or more selected from aluminum, aluminum alloy, copper, copper alloy, nickel, nickel alloy, titanium, titanium alloy, iron, iron alloy, silver, and silver alloy. The inorganic non-metallic materials are, for example, one or more selected from carbon-based materials, aluminum oxide, silicon dioxide, silicon nitride, silicon carbide, boron nitride, silicates, and titanium oxide, and are for example one or more selected from glass materials, ceramic materials and ceramic composites. The aforementioned carbon-based materials are, for example, one or more selected from graphite, superconducting carbon, acetylene black, carbon black, Ketjen black, carbon dots, carbon nanotubes, graphene, and carbon nanofibers.

In some embodiments, the additives may be a metal-coated carbon-based materials, for example, one or more selected from nickel-coated graphite powder and nickel-coated carbon fiber.

Preferably, the support layer 101 adopts one or more selected from insulating polymer materials and insulating polymer-based composite materials. The support layer 101 has a relatively high volume resistivity that may be up to $1.0 \times 10^9$ Ω·m or more. Thus, the safety performance of the secondary battery is further improved.

Further preferably, the support layer 101 may include one or more selected from polyethylene terephthalate (PET), polybutylene terephthalate (PBT), polyethylene naphthalate (PEN), poly(sodium-p-styrenesulfonate) (PSS), and polyimide (PI).

By adjusting the chemical composition, molecular weight and distribution thereof, chain structure and chain construction, aggregation structure, phase structure, additives, and the like of the polymer materials, the support layer 101 may have a predetermined volume resistivity, elongation at break and Young's modulus, so as to improve the safety performance and electrochemical performance of the secondary battery.

In some embodiments, the support layer 101 may be a single-layer structure as shown in FIG. 1 and FIG. 2, or may be a composite layer structure having two or more layers, such as two layers, three layers, and four layers.

Figure 3:
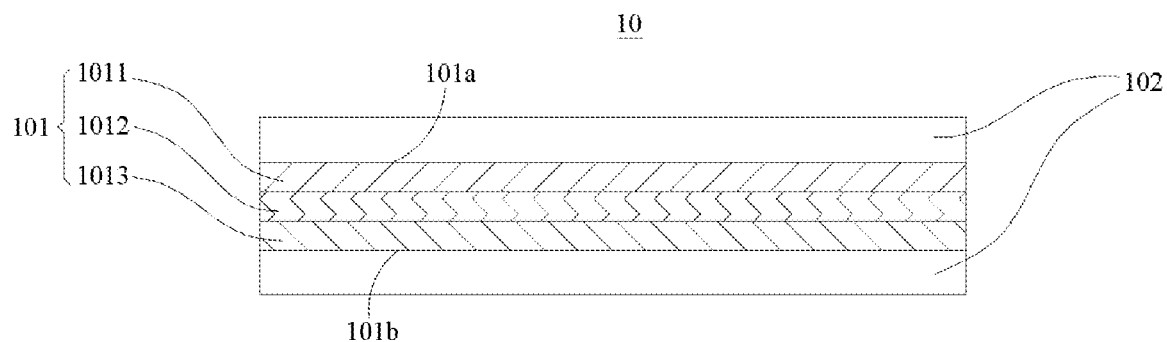
FIG. 3 shows a schematic diagram of the structure of a positive current collector provided in another embodiment of the present application.

The positive current collector 10 shown in FIG. 3 is an example of positive current collector in which the support layer 101 has a composite layer structure. Referring to FIG. 3, the support layer 101 is a composite layer structure formed by stacking a first sub-layer 1011, a second sub-layer 1012, and a third sub-layer 1013. The support layer 101 having the composite layer structure has a first surface 101a and a second surface 101b opposite to each other, and the conductive layer 102 is laminated on the first surface 101a and the second surface 101b of the support layer 101. Of course, the conductive layer 102 may be arranged only on the first surface 101a of the support layer 101, or only on the second surface 101b of the support layer 101.

Under the circumstance that the support layer 101 is a composite layer structure having two or more layers, each sub-layer has the same or different materials.

In the positive current collector 10 of the present application, the conductive layer 102 has a thickness $D_1$ satisfying 300 nm≤$D_1$≤2 μm. For example, the conductive layer 102 may have a thickness $D_1$ of 2 μm or less, 1.8 μm or less, 1.5 μm or less, 1.2 or less, 1 μm or less, or 900 nm or less, and a thickness $D_1$ of 300 nm or more, 350 nm or more, 400 nm or more, 450 nm or more, 500 nm or more, 600 nm or more, 700 nm or more, or 800 nm or more. Preferably, 500 nm≤$D_1$≤1.5 μm.

The conductive layer 102 has a small thickness, and when the secondary battery undergoes abnormal conditions such as nail penetration, would generate significantly reduced burrs as compared with the existing metal current collectors, so as to improve the nail penetration safety performance of the secondary battery. In addition, the conductive layer 102 having an appropriate thickness may ensure good electrical conductivity and current collecting performance of the positive current collector 10, thereby rendering the secondary battery to have good electrochemical performance that meets the conventional requirements, and at the same time, may ensure lower weight of the positive current collector 10, thereby rendering the secondary battery to have higher weight energy density. The conductive layer 102, owing to the thickness thereof, is difficult to be damaged during the processing and using of the positive current collector 10, so that the positive current collector 10 has good mechanical stability and operating stability together with relatively long service life.

In some embodiments, preferably, the conductive layer 102 has a volume resistivity of from $2.5 \times 10^{-8}$ Ω·m to $7.8 \times 10^{-8}$ Ω·m. The conductive layer 102 has a volume resistivity of greater than or equal to $2.5 \times 10^{-8}$ Ω·m, and thus the secondary battery has a relatively large short-circuit resistance when an internal short circuit occurs under abnormal conditions such as nail penetration. As a result, the safety performance of the secondary battery may be improved. In addition, the conductive layer 102 has a volume resistivity of less than or equal to $7.8 \times 10^{-8}$ Ω·m, which ensures good conductivity and current collecting performance of the positive current collector 10. As a result, the secondary battery using the positive current collector 10 has low impedance and reduced polarization of the positive electrode, and thus have improved electrochemical performance.

More preferably, the conductive layer 102 has a volume resistivity of from $3.2 \times 10^{-8}$ Ω·m to $7.8 \times 10^{-8}$ Ω·m.

The conductive layer 102 has a volume resistivity ρ of $\rho = R_S \times d$, where p is in Ω·m, $R_S$ is the sheet resistance of the conductive layer 102 in Ω, and d is the thickness of the conductive layer 102 in m. The sheet resistance $R_S$ of the conductive layer 102 is tested by means of a four-probe method. The exemplary method is conducted on a RTS-9 double-electric four-probe tester with the test environment of 23±2° C., 0.1 MPa, and relative humidity ≤65%. The test is performed by cleaning the surface of the positive electrode collector 10 as a sample, then placing it horizontally on the test bench; putting down the four probes so that the probes are in good contact with the surface of the conductive layer 102 of the sample; and then calibrating the current range of the sample under automatic test mode, so as to measure the sheet resistance under an appropriate current measuring range; collecting 8 to 10 data points of the same sample for data measurement accuracy and error analysis; and taking the average value as the sheet resistance of the conductive layer 102.

The conductive layer 102 includes a metal material. The metal material is, for example, one or more selected from aluminum, aluminum alloy, nickel, nickel alloy, titanium, titanium alloy, silver and silver alloy, preferably one or more selected from aluminum, aluminum alloy, nickel, nickel alloy, titanium and silver. Aluminum alloy is, for example, an aluminum-zirconium alloy. Element aluminum is present in the aluminum alloy in a weight percentage content of preferably 90 wt % or more. Nickel alloy is, for example, a nickel-copper alloy.

The conductive layer 102 may also include one or more selected from a carbon-based conductive material and a conductive polymer material. The one or more of the carbon-based conductive material and the conductive polymer material are present in the conductive layer 102 in a weight percentage of preferably 10 wt % or less.

The carbon-based conductive material is, for example, one or more selected from graphite, superconducting carbon, acetylene black, carbon black, Ketjen black, carbon dots, carbon nanotubes, graphene, and carbon nanofibers.

The conductive polymer material is, for example, one or more selected from poly(sulphur nitride), aliphatic conjugated polymers, aromatic ring conjugated polymers, and aromatic heterocyclic conjugated polymers. The aliphatic conjugated polymer is, for example, polyacetylene. The aromatic ring conjugated polymer is, for example, polyphenyl, polynaphthalene, and polyphenyl is for example polyparaphenylene. The aromatic heterocyclic conjugated polymer is, for example, polypyrrole, polyaniline, polythiophene, and polypyridine. The conductivity of the conductive polymer material may also be improved by modification with doping.

FIGS. 4 to 9 schematically show a positive current collector 10 respectively. Referring to FIGS. 4 to 9, the positive current collector 10 may optionally further include a protective layer 103. Specifically, the protective layer 103 may be arranged between the conductive layer 102 and the support layer 101. Alternatively, the protective layer 103 may be arranged on the surface of the conductive layer 102 facing away from the support layer 101. Alternatively, a protective layer 103 may be arranged both between the conductive layer 102 and the support layer 101 and on the surface of the conductive layer 102 facing away from the support layer 101.

The protective layer 103 can protect the conductive layer 102 from damages such as chemical corrosion or mechanical damage, and can ensure the operating stability and service life of the positive current collector 10 so as to be helpful to the safety performance and electrochemical performance of the secondary battery. In addition, the protective layer 103 can also enhance the mechanical strength of the positive current collector 10.

In some embodiments, the protective layer 103 may include one or more selected from metal, metal oxide, and conductive carbon.

The metal may include one or more selected from nickel, chromium, nickel-based alloys, and copper-based alloys. The nickel-based alloy is an alloy formed by adding one or more other elements to pure nickel base, and preferably is a nickel-chromium alloy. Nickel-chromium alloy is an alloy formed from metallic nickel and metallic chromium. Optionally, the weight ratio of nickel to chromium in the nickel-chromium alloy is from 1:99 to 99:1, such as 9:1. The copper-based alloy is an alloy formed by adding one or more other elements to pure copper base, and preferably is a nickel-copper alloy. Optionally, the weight ratio of nickel to copper in the nickel-copper alloy is from 1:99 to 99:1, such as 9:1.

The metal oxide may include one or more selected from aluminum oxide, cobalt oxide, chromium oxide, and nickel oxide.

The conductive carbon may include one or more selected from graphite, superconducting carbon, acetylene black, carbon black, Ketjen black, carbon dots, carbon nanotubes, graphene, and carbon nanofibers, and preferably includes one or more selected from carbon black, carbon nanotubes, acetylene black, and graphene.

In some embodiments, the protective layer 103 may include one or more selected from nickel, chromium, nickel-based alloys, copper-based alloys, aluminum oxide, cobalt oxide, chromium oxide, nickel oxide, graphite, superconducting carbon, acetylene black, carbon black, Ketjen black, carbon dots, carbon nanotubes, graphene, and carbon nanofibers.

In some preferred embodiments, the protective layer 103 may adopt metal oxide and/or metal. A metal oxide protective layer and a metal protective layer have high corrosion resistance, high hardness, and large specific surface area, and thus have high comprehensive performance.

Figure 4:
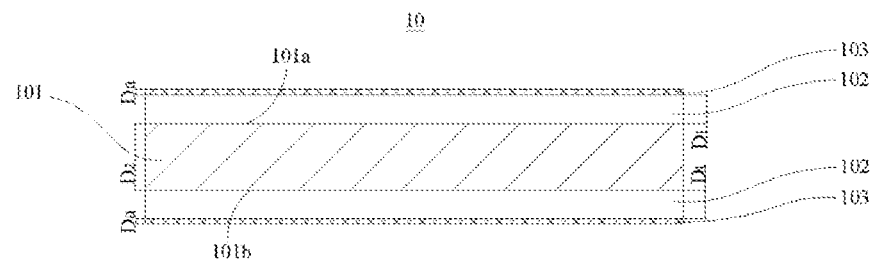
FIG. 4 shows a schematic diagram of the structure of a positive current collector provided in another embodiment of the present application.
Figure 5:
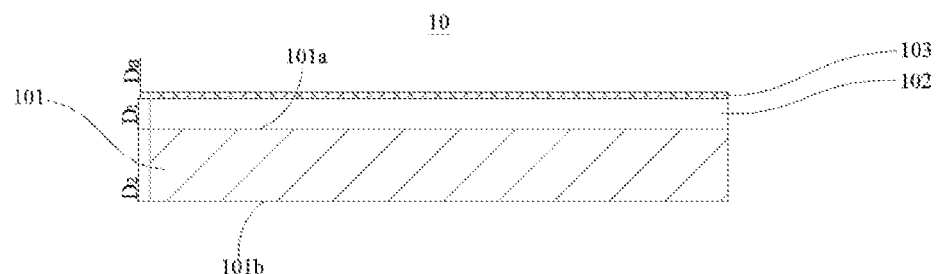
FIG. 5 shows a schematic diagram of the structure of a positive current collector according to another embodiment of the present application.

As some examples, referring to FIGS. 4 and 5, the positive current collector 10 includes a support layer 101, a conductive layer 102 and a protective layer 103 that are laminated, wherein the support layer 101 has a first surface 101a and a second surface 101b opposite to each other in its thickness direction, the conductive layer 102 is laminated on at least one of the first surface 101a and the second surface 101b of the support layer 101, and the protective layer 103 is laminated on the surface of the conductive layer 102 facing away from the support layer 101.

The protective layer 103 arranged on the surface of the conductive layer 102 facing away from the support layer 101 (hereinafter referred to as an upper protective layer) protects the conductive layer 102 from chemical corrosion and mechanical damage. In particular, the upper protective layer of metal oxide or metal can not only protect the conductive layer 102, but also improve the interface between the positive current collector 10 and the positive active material layer, reduce the interface resistance, and increase the binding force between the positive current collector 10 and the positive active material layer. As a result, the polarization of the plates is reduced and the electrochemical performance of the secondary battery is improved.

Figure 6:
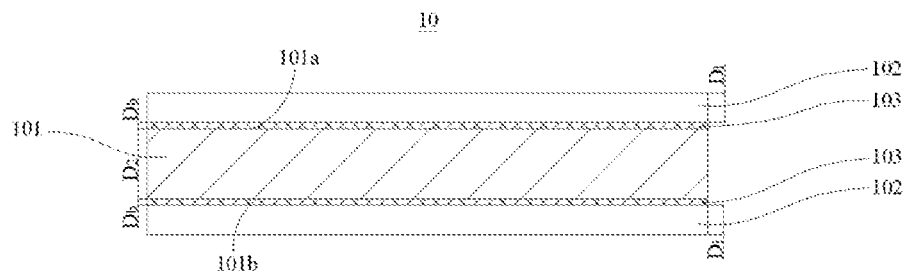
FIG. 6 shows a schematic diagram of the structure of a positive current collector provided in another embodiment of the present application.
Figure 7:
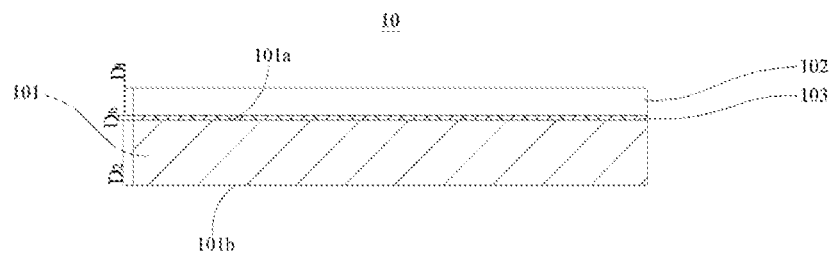
FIG. 7 shows a schematic diagram of the structure of a positive current collector provided in another embodiment of the present application.

As another example, referring to FIGS. 6 and 7, the positive current collector 10 includes a support layer 101, a conductive layer 102 and a protective layer 103 that are laminated, wherein the support layer 101 has a first surface 101a and a second surface 101b opposite to each other in its thickness direction, the conductive layer 102 is laminated on at least one of the first surface 101a and the second surface 101b of the support layer 101, and the protective layer 103 is laminated between the conductive layer 102 and the support layer 101.

The protective layer 103 arranged between the conductive layer 102 and the support layer 101 (hereinafter referred to as a lower protective layer) has the two opposite surfaces attached to the conductive layer 102 and the support layer 101 respectively. The lower protective layer can improve the support and protection effect of the support layer 101 on the conductive layer 102, and prevent the conductive layer 102 from separating from the support layer 101. At the same time, it can also protect the conductive layer 102 from chemical corrosion and mechanical damage. In particular, the lower protective layer of metal oxide or metal has high hardness and large specific surface area, and thus can have better protection effects as mentioned above. More preferably, the lower protective layer is a metal oxide protective layer. Because the metal oxide protective layer has a larger specific surface area and higher hardness, it is more beneficial for improving the interface binding force between the support layer 101 and the conductive layer 102.

Figure 8:
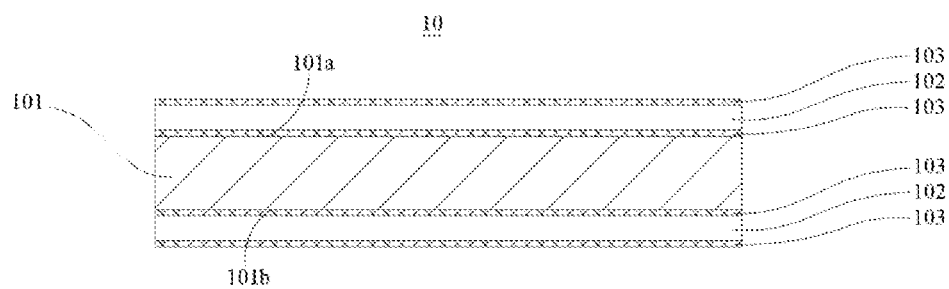
FIG. 8 shows a schematic diagram of the structure of a positive current collector according to another embodiment of the present application.
Figure 9:
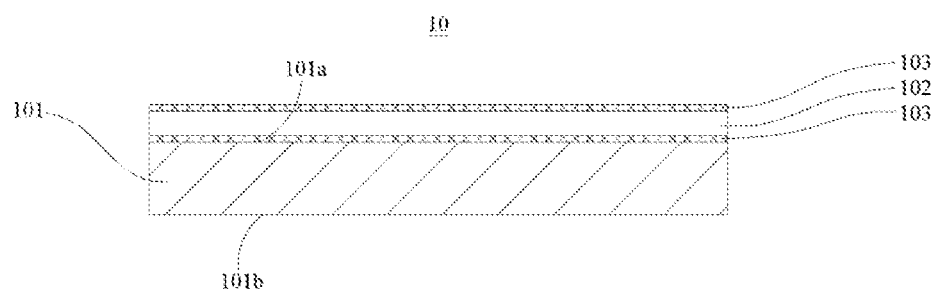
FIG. 9 shows a schematic diagram of the structure of a positive current collector provided in another embodiment of the present application.

As still another examples, referring to FIGS. 8 and 9, the positive current collector 10 includes a support layer 101, a conductive layer 102 and a protective layer 103 that are laminated, wherein the support layer 101 has a first surface 101a and a second surface 101b opposite to each other in its thickness direction, the conductive layer 102 is laminated on at least one of the first surface 101a and the second surface 101b of the support layer 101, and the protective layer 103 is arranged either between the conductive layer 102 and the support layer 101 or on the surface of the conductive layer 102 facing away from the support layer 101.

Arranging the protective layer 103 on both surfaces of the conductive layer 102 can protect the conductive layer 102 more sufficiently. It can be understood that the protective layers 103 on the two surfaces of the conductive layer 102 may have the same or different material(s), and may have the same or different thickness(es).

In some embodiments, preferably, the protective layer 103 has a thickness $D_3$ satisfying 1 nm≤$D_3$≤200 nm, and $D_3$≤0.1 $D_1$. For example, the protective layer 103 may have a thickness $D_3$ preferably of 200 nm or less, 180 nm or less, 150 nm or less, 120 nm or less, 100 nm or less, 80 nm or less, 60 nm or less, 55 nm or less, 50 nm or less, 45 nm or less, 40 nm or less, 30 nm or less, and 20 nm or less, and of 1 nm or more, 2 nm or more, 5 nm or more, 8 nm or more, 10 nm or more, 12 nm or more, 15 nm or more, and 18 nm or more. Preferably, 5 nm≤$D_3$≤200 nm. Preferably, 10 nm≤$D_3$≤200 nm.

The protective layer 103, due to the thickness thereof, is suitable for effectively protecting the conductive layer 102, and at the same time, can ensure the higher energy density of the secondary battery.

In some embodiments, when protective layers 103 are arranged on both surfaces of the conductive layer 102, the protective layer 103 on the surface of the conductive layer 102 facing away from the support layer 101 (upper protective layer) has a thickness of $D_a$, 1 nm≤$D_a$≤200 nm and $D_a$≤0.1 $D_1$; the protective layer 103 between the conductive layer 102 and the support layer 101 (lower protective layer) has a thickness of $D_b$, 1 nm≤$D_b$≤200 nm, and $D_b$≤0.1 $D_1$. Preferably, $D_a$>$D_b$. Thus, the protective layer 103 has a good protection effect on the conductive layer 102 against chemical corrosion and mechanical damage, and can increase the energy density of the secondary battery. More preferably, 0.5 $D_a$≤$D_b$≤0.8 $D_a$, so that the protective layer 103 has better protection effects as mentioned above.

The conductive layer may be formed on the support layer by at least one means selected from mechanical rolling, bonding, vapor deposition, chemical plating, and electroplating, with vapor deposition or electroplating being preferred. Thus, the conductive layer is preferably a vapor-deposited layer or an electroplated layer, which can make the conductive layer and the support layer bind tightly.

For example, the conductive layer is formed on the support layer by a vapor deposition method. The conductive layer and the support layer have a higher binding force, which is beneficial to improving the mechanical stability, operating stability and service life of the positive current collector. By reasonably adjusting the conditions of the vapor deposition process, such as the deposition temperature, the deposition rate, and the atmosphere conditions of the deposition chamber, the conductive layer may have a lower sheet resistance growth rate when the positive current collector has a tensile strain of 1.5%, so as to improve the safety performance and electrochemical performance of the positive current collector.

The vapor deposition method is preferably a physical vapor deposition method. The physical vapor deposition method is preferably at least one of an evaporation method and a sputtering method. The evaporation method is preferably at least one of a vacuum evaporation method, a thermal evaporation method, and an electron beam evaporation method, and the sputtering method is preferably a magnetron sputtering method.

As an example, the conductive layer can be formed by a vacuum evaporation method, including placing the support layer, having being subjected to surface cleaning treatment, in a vacuum coating chamber; and melting and evaporating a high-purity metal wire in the metal evaporation chamber at a high temperature of from 1300° C. to 2000° C., wherein the evaporated metal passes through a cooling system in the vacuum coating chamber, and finally deposits on the support layer to form a conductive layer.

The protective layer may be formed on the conductive layer by at least one means selected from a vapor deposition method, an in-situ forming method, and a coating method. The vapor deposition method may be one as described above. The in-situ forming method is preferably an in-situ passivation method, a method of forming a metal oxide passivation layer in situ on the metal surface. The coating method is preferably at least one of roll coating, extrusion coating, knife coating, and gravure coating.

Preferably, the protective layer is formed on the conductive layer by at least one means selected from a vapor deposition method and an in-situ forming method, which is beneficial to making the conductive layer and the protective layer have a higher binding force, so that the protective layer may better protect the positive current collector and ensure the higher operating performance of the positive current collector.

When a protective layer (i.e. a lower protective layer) is arranged between the conductive layer and the support layer, the lower protective layer may be formed on the support layer first, and then the conductive layer is formed on the lower protective layer. The lower protective layer may be formed on the support layer by at least one means selected from a vapor deposition method and a coating method. The vapor deposition is preferred for it is beneficial to obtaining a higher binding force between the lower protective layer and the support layer. The conductive layer can be formed on the lower protective layer by at least one means selected from mechanical rolling, bonding, vapor deposition, chemical plating, and electroplating. Vapor deposition or electroplating is preferred for they are beneficial to obtaining a higher binding force between the lower protective layer and the conductive layer. The vapor deposition method and the coating method may respectively be the vapor deposition method and the coating method as described above.

In some embodiments, preferably, the binding force $F_1$ between the conductive layer and the protective layer satisfies $F_1$≥100 N/m, more preferably $F_1$≥400 N/m.

In some embodiments, when the protective layer is further bonded to the support layer, preferably, the binding force between the protective layer and the support layer satisfies $F_2$≥100 N/m, more preferably $F_2$≥400 N/m.

The binding force $F_1$ between the conductive layer and the protective layer and the binding force $F_2$ between the protective layer and the support layer may be measured with reference to the above-mentioned method for testing the binding force F between the support layer and the conductive layer.

Positive Electrode Plate

A second aspect of the application provides a positive electrode plate, including a positive current collector and a positive active material layer that are laminated, wherein the positive current collector is any one of the positive current collectors according to the first aspect of the application.

Since the positive electrode plate of the present application adopts the positive current collector of the present application, it has a higher weight energy density and better nail penetration safety performance and electrochemical performance as compared with the existing positive electrode plate.

Figure 10:
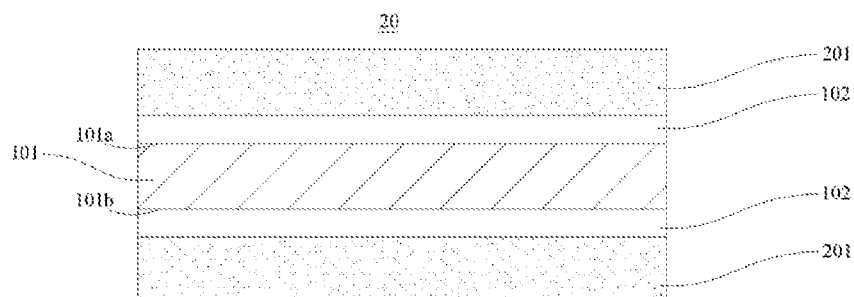
FIG. 10 shows a schematic diagram of the structure of a positive electrode plate provided in one embodiment of the present application.

FIG. 10 shows an example of positive electrode plate 20. As shown in FIG. 10, the positive electrode plate 20 includes a support layer 101, a conductive layer 102, and a positive active material layer 201 that are laminated, wherein the support layer 101 includes two opposite surfaces, the conductive layer 102 is laminated on both surfaces of the support layer 101, and the positive active material layer 201 is laminated on the surface of the conductive layer 102 facing away from the support layer 101.

Figure 11:
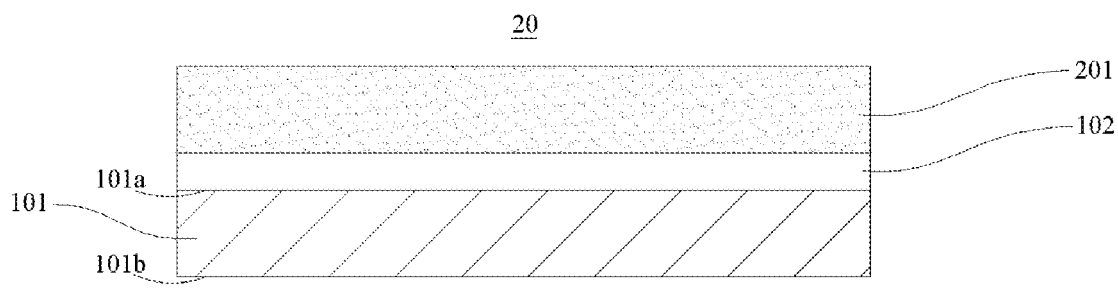
FIG. 11 shows a schematic diagram of the structure of a positive electrode plate provided in another embodiment of the present application.

FIG. 11 shows another example of positive electrode plate 20. As shown in FIG. 11, the positive electrode plate 20 includes a support layer 101, a conductive layer 102, and a positive active material layer 201 that are laminated, wherein the support layer 101 includes two opposite surfaces, the conductive layer 102 is laminated either one of the two surfaces of the support layer 101, and the positive active material layer 201 is laminated on the surface of the conductive layer 102 facing away from the support layer 101.

In the positive electrode plate 20 according to the embodiment of the present application, the positive active material layer 201 may adopt a positive electrode active material known in the art, which allows reversible intercalation/deintercalation of ions.

For example, the positive active material for lithium ion secondary batteries may be selected from lithium transition metal composite oxides, where the transition metal may be one or more selected from Mn, Fe, Ni, Co, Cr, Ti, Zn, V, Al, Zr, Ce, and Mg. The lithium transition metal composite oxide may also be doped with elements having high electronegativity, such as one or more of S, F, Cl, and I. This enables the positive active material to have higher structural stability and electrochemical performance. As an example, the lithium transition metal composite oxide is, for example, one or more selected from $LiMn_2O_4$, $LiNiO_2$, $LiCoO_2$, $LiNi_{1-y}Co_yO_2$ (0<y<1), $LiNi_aCo_bAl_{1-a-b}O_2$ (0<a<1, 0<b<1, and 0<a+b<1), $LiMn_{1-m-n}Ni_mCo_nO_2$ (0<m<1, 0<n<1, and 0<m+n<1), $LiMPO_4$ (M may be one or more of Fe, Mn, Co), and $Li_3V_2(PO_4)_3$.

In some embodiments, the positive active material layer 201 may further include a conductive agent. As an example, the conductive agent is one or more selected from graphite, superconducting carbon, acetylene black, carbon black, Ketjen black, carbon dots, carbon nanotubes, graphene, and carbon nanofibers.

In some embodiments, the positive active material layer 201 may further include a binder. As an example, the binder is one or more selected from styrene butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA), and polyvinyl butyral (PVB).

The positive electrode plate may be prepared according to conventional methods in the art. Usually the positive active material, an optional conductive agent, and a binder are dispersed in a solvent (such as N-methylpyrrolidone, referred to as NMP) to form a uniform positive electrode slurry; then the positive current collector is coated with the positive electrode slurry, and after drying, the positive electrode plate is obtained.

Secondary Battery

A third aspect of the present application provides a secondary battery, including a positive electrode plate, a negative electrode plate, a separator and an electrolyte, wherein the positive electrode plate is any one of the positive electrode plates according to the second aspect of the application.

Examples of secondary batteries include, but are not limited to, lithium ion secondary batteries, sodium ion batteries, magnesium ion batteries, and the like.

The secondary battery of the present application adopts the positive electrode plate according to the second aspect of the present application, and thus can have higher weight energy density, good nail penetration safety performance, and electrochemical performance.

The negative electrode plate may include a negative current collector and a negative active material layer arranged on the negative current collector.

The negative electrode current collector may be metal foil, carbon-coated metal foil and porous metal foil. The negative electrode current collector may adopt one or more selected from copper, copper alloy, nickel, nickel alloy, iron, iron alloy, titanium, titanium alloy, silver, and silver alloy.

The negative electrode active material layer may adopt a negative electrode active material known in the art, which allows reversible intercalation/deintercalation of ions. For example, the negative active material for lithium ion secondary batteries may include one or more selected from metallic lithium, natural graphite, artificial graphite, mesophase micro-carbon spheres (abbreviated as MCMB), hard carbon, soft carbon, silicon, silicon-carbon composite, SiO, Li—Sn alloy, Li—Sn—O alloy, Sn, SnO, $SnO_2$, lithium titanate of spinel structure, and Li—Al alloy.

Optionally, the negative active material layer may further include a binder. As an example, the binder may be one or more selected from styrene-butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA), and polyvinyl butyral (PVB).

Optionally, the negative active material layer may further include a conductive agent. As an example, the conductive agent may be one or more selected from of graphite, superconducting carbon, acetylene black, carbon black, Ketjen black, carbon dots, carbon nanotubes, graphene, and carbon nanofibers.

The negative electrode may be prepared according to conventional methods in the art. Generally, the negative electrode active material, an optional conductive agent, a binder, a thickening agent, and a dispersing agent are dispersed in a solvent to form a uniform negative electrode slurry, wherein the solvent may be NMP or deionized water; then a negative current collector was coated with the negative electrode slurry, and after drying, the negative electrode plate is obtained.

The separator is not specifically limited, and may be any well-known porous separator having electrochemical and chemical stability. For example, it may be single-layer or multi-layer films, which is one or more selected from glass fiber, non-woven fabric, polyethylene, polypropylene and polyvinylidene fluoride.

The electrolyte may be selected from solid electrolytes and electrolyte solutions. The electrolyte solutions includes an organic solvent and an electrolyte salt. The organic solvent, as a medium for transporting ions in an electrochemical reaction, may be organic solvents used for secondary battery electrolytes well-known in the art. The electrolyte salt, as a source donating ions, may be an electrolyte salt used for the electrolyte of a secondary battery well-known in the art.

For example, the organic solvent used in lithium ion secondary batteries may be one or more, and preferably more than two, selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

For example, the electrolyte salt used for lithium ion secondary batteries may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis(fluorosulfonyl)imide), LiTFSI (lithium bis(trifluoromethane sulfonimide)), LiTFS (lithium trifluoromethanesulfonate), LiDFOB (lithium difluoro (oxalato)borate), LiBOB (lithium bis(oxalate)borate), $LiPO_2F_2$ (lithium difluorophosphate), LiDFOP (lithium difluorodi(oxalato)phosphate) and LiTFOP (lithium tetrafluoro(oxalato)phosphate).

In some embodiments, the secondary battery may include an outer package for encapsulating the positive electrode plate, the negative electrode plate, and the electrolyte. As an example, the positive electrode plate, the negative electrode plate and the separator may form an electrode assembly of laminated structure or wound structure by laminating or wounding, and the electrode assembly is encapsulated in an outer package. The electrolyte may be an electrolyte solution, in which the electrode assembly is immersed. The number of electrode assemblies in the secondary battery may be one or several, and may be adjusted according to requirements.

In some embodiments, the outer packaging of the secondary battery may be a soft bag, such as a pouch-type soft bag. The soft bag may be made of plastic including for example one or more selected from polypropylene PP, polybutylene terephthalate PBT, polybutylene succinate PBS and the like. The outer packaging of the secondary battery may also be a hard case, such as an aluminum case.

Figure 12:
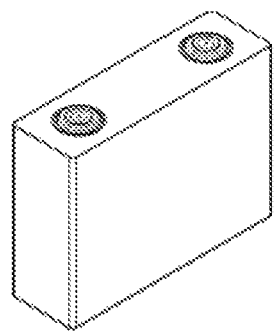
FIG. 12 is a schematic diagram of a secondary battery provided in one embodiment of the present application.

The present application has no particular limitation to the shape of the secondary battery, which thus may be cylindrical, square or other arbitrary shapes. FIG. 12 shows an example of the secondary battery 5 having a square structure.

In some embodiments, the secondary battery can be assembled into a battery module. The number of secondary batteries included in the battery module may be more than one, and the particular number may be adjusted according to the application and capacity of the battery module.

Figure 13:
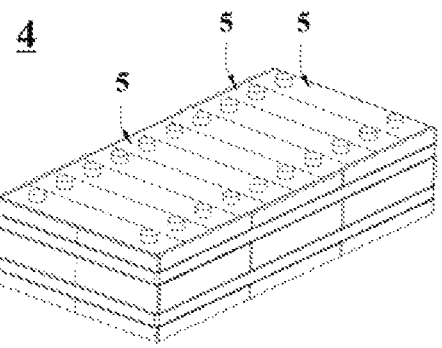
FIG. 13 is a schematic diagram of a battery module provided in one embodiment of the present application.

FIG. 13 shows an example of the battery module 4. Referring to FIG. 13, in the battery module 4, a plurality of secondary batteries 5 may be arranged in sequence along the length direction of the battery module 4. Of course, they may be arranged in any other manner. Furthermore, a plurality of secondary batteries 5 can be fixed by fasteners.

Optionally, the battery module 4 may further include a housing having an accommodating space, in which a plurality of secondary batteries 5 are accommodated.

In some embodiments, the above-mentioned battery modules may also be assembled into a battery pack, and the number of battery modules included in the battery pack may be adjusted according to the application and capacity of the battery pack.

Figure 14:
FIG. 14 is a schematic diagram of a battery pack provided in one embodiment of the present application.
Figure 15:
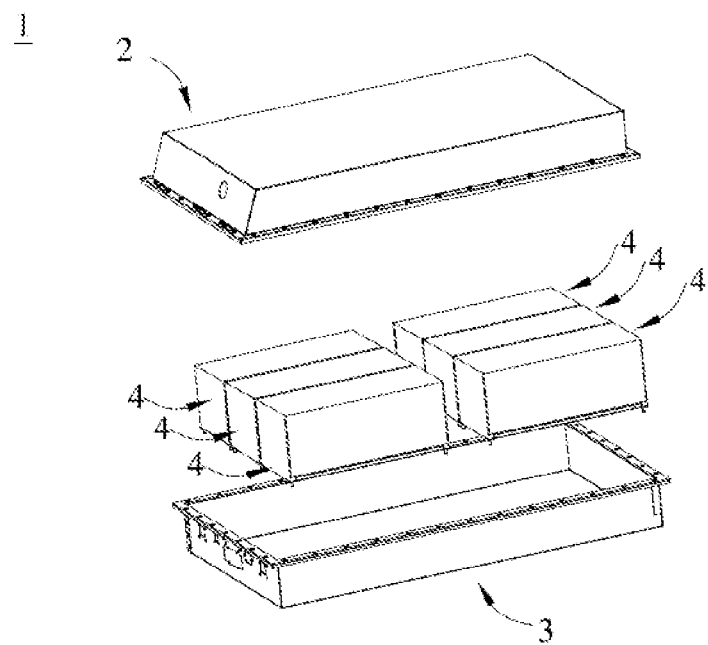
FIG. 15 is an exploded view of FIG. 14.

FIGS. 14 and 15 show an example of the battery pack 1. Referring to FIGS. 14 and 15, the battery pack 1 may include a battery case and a plurality of battery modules 4 provided in the battery case. The battery case includes an upper case body 2 and a lower case body 3. The upper case body 2 may cover the lower case body 3 to form a closed space for accommodating the battery module 4. A plurality of battery modules 4 may be arranged in the battery box in arbitrary manner.

Apparatus

A fourth aspect of the present application provides an apparatus including the secondary battery according to the third aspect of the present application, wherein the secondary battery provides power for the apparatus. The apparatus may be, but is not limited to, mobile apparatuses (such as mobile phones, notebook computers, etc.), electric vehicles (such as pure electric vehicles, hybrid electric vehicles, plug-in hybrid electric vehicles, electric bicycles, electric scooters, electric golf vehicles, electric trucks, etc.), electric trains, ships and satellites, energy storage systems, etc.

The apparatus, according to its using requirements, may include a secondary battery, a battery module, or a battery pack.

Figure 16:
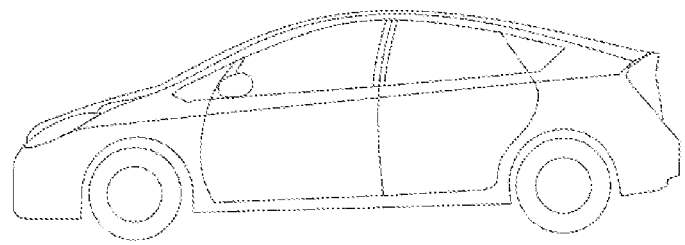
FIG. 16 is a schematic diagram of an apparatus provided in one embodiment of the present application.

FIG. 16 shows an example of the apparatus. The apparatus is a pure electric vehicle, a hybrid electric vehicle, a plug-in hybrid electric vehicle, etc. In order to meet the requirements of the apparatus for high power and high energy density of the secondary battery, a battery pack or a battery module can be used.

As another example, the apparatus may be a mobile phone, a tablet computer, a notebook computer etc. The apparatus is generally required to be thin and light, and may include the secondary battery as a power source.

EXAMPLES

The disclosure of the present application is described in more details through the following examples, which are only for illustrative purpose, because it is apparent to a person of ordinary skill in the art that various modifications and changes could be made within the scope of the disclosure of the present application. Unless otherwise stated, all parts, percentages, and ratios reported in the examples below are based on weight, all the reagents used in the examples are commercially available or synthesized according to conventional methods and can be directly used without further treatment, and all the instruments used in the examples are commercially available.

Preparation

Preparation of Positive Current Collector

A support layer having a predetermined thickness was selected to be subjected to surface cleaning treatment. The support layer after being subjected to surface cleaning treatment was placed in a vacuum plating chamber. The high-purity aluminum wire in the metal evaporation chamber was melted to evaporate under a high temperature of from 1300° C. to 2000° C. The evaporated metal passed through the cooling system of the vacuum plating chamber, and was finally deposited on the two surfaces of the support layer to form conductive layers.

Preparation of Positive Electrode Plate

A positive electrode active material $LiNi_{1/3}Co_{1/3}Mn_{1/3}O_2$ (referred to as NCM333), a conductive carbon black, and a binder polyvinylidene fluoride (PVDF) at a weight ratio of 93:2:5 were fully stirred to mix in an appropriate amount of N-methylpyrrolidone (NMP), so as to form a uniform positive electrode slurry; the positive current collector was coated with the positive electrode slurry; and after processes of drying etc., the positive electrode plate was obtained.

Preparation for Conventional Positive Electrode Plate

The preparation of the conventional positive electrode plate was the same as that of the positive electrode plate of the present application with the exception that an aluminum foil of 12 μm was used.

Negative Current Collector

A copper foil having a thickness of 8 μm was used.

Preparation of Conventional Negative Electrode Plate

Graphite as a negative active material, conductive carbon black, sodium carboxymethyl cellulose as a thickener, and styrene butadiene rubber emulsion as a binder at a weight ratio of 96.5:1.0:1.0:1.5 were fully stirred to mix in an appropriate amount of deionized water, so as to form a uniform negative electrode slurry; the negative current collector was coated with the negative electrode slurry, and after processes of drying etc., a negative electrode plate was obtained.

Preparation of Electrolyte Solution

Ethylene carbonate (EC) and ethyl methyl carbonate (EMC) in a volume ratio of 3:7 were uniformly mixed to obtain an organic solvent, and then 1 mol/L of $LiPF_6$ was uniformly dissolved in organic solvent as prepared above.

Preparation of Lithium Ion Secondary Battery

The positive electrode plate, a separator, and the negative electrode plate were laminated in sequence, and then were wound into an electrode assembly, which was placed into an outer package, wherein the separator, as a composite film of PP/PE/PP, was arranged between the positive and the negative electrode plate to isolate them; the electrolyte solution as prepared above was injected into the electrode assembly; and after being subjected to the processes of sealing, standing, hot-cold pressing, forming, etc., a lithium-ion secondary battery was obtained.

Test Methods

1. Test of Positive Current Collector

The volume resistivity of the support layer, the sheet resistance growth rate T of the conductive layer when the positive current collector has a tensile strain of 1.5%, and the Young's modulus E of the support layer were respectively tested by methods as described above.

2. Test for Battery Performance (1) Test of Cycle Performance

At 25° C., the battery was charged to 4.2V at a constant current rate of 1 C, then was charged to a current less than or equal to 0.05 C at a constant voltage, and then was discharged to 2.8V at a constant current rate of 1 C, which was a charge-discharge cycle. The discharge capacity as above was the discharge capacity of the first cycle. The battery was subjected to 1000 charge-discharge cycles according to the above method, and the discharge capacity of the 1000th cycle was recorded.

The capacity retention rate (%) of the lithium ion secondary battery for 1000 cycles of 1 C/1 C at 25° C.=the discharge capacity of the 1000th cycle/the discharge capacity of the first cycle×100%.

The capacity retention rate of the battery for 1000 cycles of 1 C/1 C at 45° C. was measured with reference to the above method.

(2) Test of Nail Penetration

At 25° C., the lithium ion secondary battery was charged to 4.2V at a constant current rate of 1 C, and then was charged to a current less than or equal to 0.05 C at a constant voltage. Afterwards, the lithium ion secondary battery was penetrated through with a steel nail having a diameter of 8 mm at a speed of 25 mm/s, and was monitored for its temperature rise and voltage with the steel nail being retained in the lithium ion secondary battery.

Test of the battery temperature: the test was performed by attaching sensing wires to the front and back surfaces through which the nail penetrated at their geometric centers by means of a Multi-Channel Thermometer. After nail penetration, a battery temperature tracking test was conducted for five minutes, and then the battery temperature at the end of five minutes was recorded as the value of temperature rise of battery.

Test of battery voltage: The positive and negative electrodes of the battery to be nail-penetrated were connected to the measuring terminal of an Internal Resistance Meter. After nail penetration, a battery voltage tracking test was conducted for five minutes, and then the battery voltage at the end of five minutes was recorded.

Results of Tests

1. Electrochemical performance of the positive current collectors according to the present application and effect thereof on the nail penetration safety performance of secondary batteries.

TABLE 1

| Nos. of Positive electrode plates | Support layers | | Conductive layers | | Positive active material layers | |
|---|---|---|---|---|---|---|
| | Materials | $D_2$ (μm) | Materials | $D_1$ (μm) | Positive active materials | Thickness (μm) |
| Positive electrode plate 1 | PI | 6 | Al | 0.3 | NCM333 | 55 |
| Positive electrode plate 2 | PET | 5 | Al | 0.5 | NCM333 | 55 |
| Positive electrode plate 3 | PI | 2 | Al | 0.8 | NCM333 | 55 |
| Positive electrode plate 4 | PET | 10 | Al | 1 | NCM333 | 55 |
| Positive electrode plate 5 | PI | 5 | Al | 2 | NCM333 | 55 |
| Conventional positive electrode plate | / | / | Al | 12 | NCM333 | 55 |

TABLE 2

| Nos. of Positive electrode plates | Lower protective layers Materials | $D_b$ (nm) | Upper protective layers Materials | $D_a$ (nm) |
|---|---|---|---|---|
| *Positive electrode plate 3-1 | / | / | Nickel | 1 |
| *Positive electrode plate 3-2 | / | / | Nickel oxide | 10 |
| *Positive electrode plate 3-3 | / | / | Aluminium oxide | 50 |
| **Positive electrode plate 5-4 | / | / | Nickel oxide | 150 |
| *Positive electrode plate 3-5 | Nickel | 5 | / | / |
| *Positive electrode plate 3-6 | Aluminium oxide | 20 | / | / |
| *Positive electrode plate 3-7 | Aluminium oxide | 80 | / | / |
| **Positive electrode plate 5-8 | Nickel oxide | 100 | / | / |
| *Positive electrode plate 3-9 | Nickel | 5 | Nickel | 10 |
| *Positive electrode plate 3-10 | Nickel oxide | 8 | Nickel oxide | 10 |
| *Positive electrode plate 3-11 | Nickel oxide | 20 | Nickel oxide | 50 |
| **Positive electrode plate 5-12 | Nickel oxide | 30 | Nickel oxide | 50 |
| **Positive electrode plate 5-13 | Nickel oxide | 50 | Nickel oxide | 100 |

Note:
*denotes those electrode plates in which the protective layer(s) was arranged on the positive electrode plate 3;
and **denotes those electrode plates in which the protective layer(s) was arranged on the positive electrode plate 5.

TABLE 3

| Nos. of batteries | Composition of plates | |
|---|---|---|
| Battery 1 | Conventional positive electrode plate | Conventional negative electrode plate |
| Battery 2 | positive electrode plate 1 | Conventional negative electrode plate |
| Battery 3 | positive electrode plate 2 | Conventional negative electrode plate |
| Battery 4 | positive electrode plate 3 | Conventional negative electrode plate |
| Battery 5 | positive electrode plate 4 | Conventional negative electrode plate |
| Battery 6 | positive electrode plate 5 | Conventional negative electrode plate |
| Battery 7 | positive electrode plate 3-1 | Conventional negative electrode plate |
| Battery 8 | positive electrode plate 3-2 | Conventional negative electrode plate |
| Battery 9 | positive electrode plate 3-3 | Conventional negative electrode plate |
| Battery 10 | positive electrode plate 5-4 | Conventional negative electrode plate |
| Battery 11 | positive electrode plate 3-5 | Conventional negative electrode plate |
| Battery 12 | positive electrode plate 3-6 | Conventional negative electrode plate |
| Battery 13 | positive electrode plate 3-7 | Conventional negative electrode plate |
| Battery 14 | positive electrode plate 5-8 | Conventional negative electrode plate |
| Battery 15 | positive electrode plate 3-9 | Conventional negative electrode plate |
| Battery 16 | positive electrode plate 3-10 | Conventional negative electrode plate |
| Battery 17 | positive electrode plate 3-11 | Conventional negative electrode plate |
| Battery 18 | positive electrode plate 5-12 | Conventional negative electrode plate |
| Battery 19 | positive electrode plate 5-13 | Conventional negative electrode plate |

TABLE 4

| Nos. of batteries | Capacity retention rate for 1000 cycles of 1C/1C (%) | | Nail penetration | |
|---|---|---|---|---|
| | 25° C. | 45° C. | Temperature rise of batteries (° C.) | Voltage of batteries (V) |
| Battery 1 | 89.2 | 86.5 | 500 | 0 |
| Battery 2 | 85.0 | 80.1 | 3.9 | 4.13 |
| Battery 3 | 87.0 | 81.0 | 5.5 | 4.11 |
| Battery 4 | 87.3 | 82.1 | 6.0 | 4.10 |
| Battery 5 | 87.5 | 82.4 | 10.1 | 3.97 |
| Battery 6 | 87.9 | 83.2 | 17.2 | 3.85 |
| Battery 7 | 87.7 | 81.9 | 5.9 | 4.11 |
| Battery 8 | 88.2 | 83.2 | 4.9 | 4.14 |
| Battery 9 | 88.7 | 86.2 | 4.3 | 4.11 |
| Battery 10 | 87.6 | 82.5 | 5.5 | 4.15 |
| Battery 11 | 87.9 | 82.1 | 5.7 | 4.10 |
| Battery 12 | 88.4 | 85.9 | 5.4 | 4.11 |
| Battery 13 | 88.6 | 83.4 | 5.1 | 4.09 |
| Battery 14 | 88.6 | 82.1 | 5.7 | 4.12 |
| Battery 15 | 88.2 | 82.8 | 5.4 | 4.14 |
| Battery 16 | 88.5 | 85.2 | 5.1 | 4.13 |
| Battery 17 | 88.7 | 85.3 | 4.4 | 4.11 |
| Battery 18 | 88.6 | 85.7 | 5.5 | 4.14 |
| Battery 19 | 87.9 | 83.5 | 5.3 | 4.12 |

The batteries adopting the positive current collectors according to the present application had good cycle life, which were equivalent to those batteries adopting conventional positive current collectors in terms of cycle performance. This indicated that the positive current collectors according to the present application would not bring about a significantly adverse effect on the electrochemical performance of the positive electrode plates and the batteries. Especially, the batteries adopting positive current collectors provided with a protective layer, had further improved capacity retention rate for 1000 cycles of 1 C/1 C, indicating that the batteries exhibited better reliability.

In addition, by adopting the positive current collector according to the present application, the lithium ion batteries had greatly improved nail penetration safety performance. From the data shown in Table 4, it could be seen that, at the moment of nail penetration, the battery adopting conventional positive current collector would undergo a sudden temperature rise of 500° C. and a sudden voltage drop to zero. This indicates that, at the moment of nail penetration, the battery would undergo an internal short circuit, which generates a lot of heat, and in turn the battery would undergo instant thermal runaway destruction, resulting in failure. In the test of nail penetration, the batteries adopting the positive current collectors according to the present application had a temperature rise that was controlled at around 10° C. or below 10° C., and were kept at basically stable battery voltage, so that the batteries could operate in a normal way.

Under the circumstances that the batteries undergone an internal short circuit, the positive current collectors according to the present application could greatly reduce the heat generated from short-circuit, and thus could improve the safety performance of the batteries. In addition, the positive current collectors according to the present application could limit the impact of the short-circuit damage to the batteries in a "point" area, forming only "Point Break", and thus the battery could operate normally in a short time.

2. Effect of the positive current collectors according to the present application on the weight energy density of the secondary batteries.

TABLE 5

| Nos. of Positive current collectors | Support layers Materials | $D_2$ (μm) | Conductive layers Materials | $D_1$ (μm) | Thickness of positive current collectors (μm) | Weight percentage of positive current collectors (%) |
|---|---|---|---|---|---|---|
| Positive current collector 21 | PET | 10 | Al | 0.5 | 11.0 | 48.3 |
| Positive current collector 22 | PI | 6 | Al | 0.3 | 6.6 | 30.0 |
| Positive current collector 23 | PI | 5 | Al | 1.5 | 8.0 | 45.8 |
| Positive current collector 24 | PET | 4 | Al | 0.9 | 5.8 | 31.0 |
| Positive current collector 25 | PI | 3 | Al | 0.2 | 3.4 | 15.8 |
| Positive current collector 26 | PI | 1 | Al | 0.4 | 1.8 | 10.9 |
| Conventional positive current collector | / | / | Al | / | 12.0 | 100 |

In Table 5, the weight percentage of the positive current collector referred to the weight percentage obtained by dividing the weight per unit area of the positive current collectors by the weight per unit area of the conventional positive current collectors.

As compared with the traditional positive collector of aluminum foil, the weight of the positive current collectors according to the present application were reduced to some extents, so that the weight energy density of the batteries could be improved.

3. Effect of the tensile resistance growth rate of the positive current collectors on the secondary batteries.

TABLE 6

| Nos. of Positive current collectors | Conductive layers Materials | $D_1$ (μm) | T (%) | Support layers Materials | $D_2$ (μm) | Volume resistivity (Ω·m) | E (GPa) |
|---|---|---|---|---|---|---|---|
| Positive current collector 31 | Al | 0.7 | 30 | PET | 10 | $2.1 \times 10^{14}$ | 4.2 |
| Positive current collector 32 | Al | 0.7 | 20 | PET | 10 | $2.1 \times 10^{14}$ | 4.2 |
| Positive current collector 33 | Al | 0.7 | 15 | PET | 10 | $2.1 \times 10^{14}$ | 4.2 |
| Positive current collector 34 | Al | 0.9 | 8 | PET | 10 | $2.1 \times 10^{14}$ | 4.2 |
| Positive current collector 35 | Al | 1.2 | 5 | PET | 10 | $2.1 \times 10^{14}$ | 4.2 |
| Positive current collector 36 | Al | 0.9 | 0 | PET | 10 | $2.1 \times 10^{14}$ | 4.2 |
| Positive current collector 37 | Aluminum alloy | 0.9 | 12 | PET | 10 | $2.1 \times 10^{14}$ | 4.2 |
| Comparative positive current collector1 | Al | 0.6 | 35 | PET | 10 | $2.1 \times 10^{14}$ | 4.2 |

In Table 6, the aluminum alloy had a composition of 92.5 wt % of aluminum and the balance of 7.5 wt % of zirconium.

The positive current collectors in Table 6 were subjected to an overcurrent test and samples for the overcurrent test were prepared by cutting the positive current collectors into a sheet of 100 mm width; applying an active material layer of 80 mm width at the center of the sheet in the width direction and rolling it to obtain plates; cutting the rolled plates into strips of 100 mm×30 mm along the width direction, 5 strips for each plate sample. During the test, the uncoated conductive areas on both sides of the plate sample were respectively connected to the positive and negative terminals of the Charging and Discharging Machine, and then by setting the Charging and Discharging Machine, a 10 A current flowed through the plate and the plate was kept at the current for 10 s. If there was no fusing, it meant that the plate passed the test, otherwise, it means fail. Five samples as a group were tested, and the results of overcurrent test were shown in Table 7 below.

TABLE 7

| Nos. of Positive electrode plates | Nos. of Positive current collectors | Results of overcurrent test |
|---|---|---|
| Positive electrode plate 31 | Positive current collector 31 | 3/5 |
| Positive electrode plate 32 | Positive current collector 32 | 4/5 |
| Positive electrode plate 33 | Positive current collector 33 | 5/5 |
| Positive electrode plate 34 | Positive current collector 34 | 5/5 |
| Positive electrode plate 35 | Positive current collector 35 | 5/5 |

TABLE 7-continued

| Nos. of Positive electrode plates | Nos. of Positive current collectors | Results of overcurrent test |
|---|---|---|
| Positive electrode plate 36 | Positive current collector 36 | 5/5 |
| Positive electrode plate 37 | Positive current collector 37 | 5/5 |
| Comparative positive electrode plate 1 | Comparative positive current collector 1 | 0/5 |

When the tensile strain of the positive current collectors was 1.5%, the sheet resistance growth rate T of the conductive layers was not more than 30%, thus the positive electrode plates adopting such positive current collectors could have better conductivity after rolling. Otherwise, other positive electrode plates would have poor conductivity, resulting in little practical value in battery products. Preferably, when the tensile strain of the positive current collector was 1.5%, the sheet resistance growth rate of the conductive layer satisfied T≤15%, more preferably T≤5%.

Below are some exemplary embodiments of the present application.

Embodiment 1. A positive current collector comprising
a support layer having two surfaces opposite to each other in its thickness direction;
a conductive layer arranged on at least one of the two surfaces of the support layer,
wherein, the conductive layer has a thickness $D_1$ satisfying 300 nm≤$D_1$≤2 µm, preferably 500 nm≤$D_1$≤1.5 µm; and
when the positive current collector has a tensile strain of 1.5%, the conductive layer has a sheet resistance growth rate of T≤30%, preferably of T≤15%, and more preferably of T≤5%.

Embodiment 2. The positive current collector according to Embodiment 1, wherein,
the support layer has a volume resistivity of greater than or equal to $1.0\times10^{-5}$ Ω·m; and/or,
the conductive layer has a volume resistivity of from $2.5\times10^{-8}$ Ω·m to $7.8\times10^{-8}$ Ω·m, preferably from $3.2\times10^{-8}$ Ω·m to $7.8\times10^{-8}$ Ω·m.

Embodiment 3. The positive current collector according to Embodiment 1 or 2, wherein the conductive layer comprises a metal material, and preferably comprises one or more of selected from aluminum, aluminum alloy, nickel, nickel alloy, titanium, and silver.

Embodiment 4. The positive current collector according to any one of Embodiments 1 to 3, further comprising a protective layer wherein the protective layer is arranged between the conductive layer and the support layer, and/or the protective layer is arranged on the surface of the conductive layer facing away the surface of the support layer.

Embodiment 5. The positive current collector according to any one of Embodiments 1 to 4, wherein the protective layer comprises one or more selected from metal, metal oxide, and conductive carbon, and preferably comprises one or more selected from nickel, chromium, nickel-based alloy, copper-based alloy, aluminium oxide, cobalt oxide, chromium oxide, nickel oxide, graphite, superconducting carbon, acetylene black, carbon black, Ketjen black, carbon dots, carbon nanotubes, graphene, and carbon nanofibers.

Embodiment 6. The positive current collector according to any one of Embodiments 1 to 5, wherein the protective layer has a thickness $D_3$ satisfying 1 nm≤$D_3$≤200 nm, and $D_3$≤0.1 $D_1$.

Embodiment 7. The positive current collector according to any one of Embodiments 1 to 6, wherein the support layer has a thickness $D_2$ satisfying 1 µm≤$D_2$≤20 µm, preferably 2 µm≤$D_2$≤10 µm, and more preferably 2 µm≤$D_2$≤6 µm.

Embodiment 8. The positive current collector according to any one of Embodiments 1 to 7, wherein the support layer comprises one or more selected from a polymer material and a polymer-based composite material;
the polymer material is one or more selected from polyamide, polyimide, polyethylene terephthalate, polybutylene terephthalate, polyethylene naphthalate, polycarbonate, polyethylene, polypropylene, polypropyleneethylene, acrylonitrile-butadiene-styrene copolymer, polyvinyl alcohol, polystyrene, polyvinyl chloride, polyvinylidene fluoride, polytetrafluoroethylene, poly(sodium-p-styrenesulfonate), polyacetylene, silicone rubber, polyoxymethylene, polyphenylene ether, polyphenylene sulfide, polyethylene glycol, poly(sulfur nitride) polymers, polyphenyl, polypyrrole, polyaniline, polythiophene, polypyridine, cellulose, starch, protein, epoxy resin, phenolic resin, and the derivatives, cross-linked products and copolymers thereof; and
the polymer-based composite material comprises one or more of the polymer materials and an additive, wherein the additive includes one or more selected from a metallic material and an inorganic non-metallic material.

Embodiment 9. The positive current collector according to any one of Embodiments 1 to 8, wherein:
the support layer has an elongation at break of greater than or equal to that of the conductive layer; and/or,
the support layer has a Young's modulus of E≥4 GPa, preferably of 4 GPa≤E≤20 GPa.

Embodiment 10. The positive current collector according to any of Embodiments 1 to 9, wherein the conductive layer is a vapor deposited layer or an electroplated layer.

Embodiment 11. A positive electrode plate including a positive current collector and a positive active material layer arranged on the positive current collector, wherein the positive current collector is the positive current collector according to any of Embodiments 1 to 10.

Embodiment 12. A secondary battery including a positive electrode plate, a negative electrode plate, a separator and an electrolyte, wherein the positive electrode plate is the positive electrode plate according to Embodiment 11.

Embodiment 13. An apparatus including the secondary battery according Embodiment 12.

Above described are only specific implementations of the present application, but the protection scope of the present application are not intended to be limited thereto. According to the disclosure of the present application, a person of ordinary skill in the art could readily conceive various equivalent modifications and replacements, which shall as a matter of course fall within the protection scope of the present application. Therefore, the protection scope of the present application shall be determined by that of the claims.

What is claimed is:

1. A positive current collector (10) comprising
a support layer (101) having two surfaces (101a, 101b) opposite to each other in its thickness direction;
a conductive layer (102) arranged on at least one of the two surfaces (101a, 101b) of the support layer,
wherein, the conductive layer (102) has a thickness $D_1$ satisfying 300 nm≤$D_1$≤2 μm; and
when the positive current collector (10) has a tensile strain of 1.5%, the conductive layer has a sheet resistance growth rate of T≤30%; and
wherein the support layer comprises a polymeric material selected from PET; and
wherein the conductive layer comprises a metal material selected from aluminum and aluminum alloy; and
wherein the positive current collector (10) further comprises a protective layer (103) wherein the protective layer (103) is arranged between the conductive layer (102) and the support layer (101); and the protective layer (103) has a thickness $D_3$ satisfying 20 nm≤$D_3$≤50 nm;
alternatively,
wherein the positive current collector (10) further comprises a protective layer (103) wherein the protective layer (103) is arranged between the conductive layer (102) and the support layer (101), and the protective layer (103) is arranged on the surface of the conductive layer (102) facing away the surface of the support layer (101); and the protective layer (103) has a thickness $D_3$ satisfying 8 nm≤$D_3$≤50 nm.

2. The positive current collector (10) according to claim 1, wherein,
the support layer has a volume resistivity of greater than or equal to $1.0×10^{-5}$ Ω·m; and/or,
the conductive layer has a volume resistivity of from $2.5×10^{-8}$ Ω·m to $7.8×10^{-8}$ Ω·m.

3. The positive current collector (10) according to claim 2, wherein,
the conductive layer has a volume resistivity of from $3.2×10^{-8}$ Ω·m to $7.8×10^{-8}$ Ω·m.

4. The positive current collector (10) according to claim 1, wherein the support layer (101) has a thickness $D_2$ satisfying 1 μm≤$D_2$≤20 μm.

5. The positive current collector according to claim 1, wherein:
the support layer (101) has an elongation at break of greater than or equal to that of the conductive layer; and/or,
the support layer (101) has a Young's modulus of E≥4 GPa.

6. The positive current collector (10) according to claim 1, wherein the conductive layer (102) is a vapor deposited layer or an electroplated layer.

7. A positive electrode plate (20) including a positive current collector (10) and a positive active material layer (201) arranged on the positive current collector (10), wherein the positive current collector (10) is the positive current collector according to claim 1.

8. A secondary battery (5) including a positive electrode plate (20), a negative electrode plate, a separator and an electrolyte, wherein the positive electrode plate (20) is the positive electrode plate according to claim 7.

9. An apparatus including the secondary battery (5) according claim 8.

10. The positive current collector (10) according to claim 1, wherein the conductive layer (102) has a thickness $D_1$ satisfying 500 nm≤$D_1$≤1.5 μm.

11. The positive current collector (10) according to claim 1, wherein when the positive current collector (10) has a tensile strain of 1.5%, the conductive layer has a sheet resistance growth rate of T≤15%.

12. The positive current collector (10) according to claim 1, wherein when the positive current collector (10) has a tensile strain of 1.5%, the conductive layer has a sheet resistance growth rate of T≤5%.

13. The positive current collector (10) according to claim 1, wherein the support layer (101) has a thickness D2 satisfying 2 μm≤$D_2$≤10 μm.

14. The positive current collector (10) according to claim 1, wherein the support layer (101) has a thickness D2 satisfying 2 μm≤$D_2$≤6 μm.

15. The positive current collector according to claim 1, wherein the support layer (101) has a Young's modulus of 4 GPa≤E≤20 GPa.

16. The positive current collector (10) according to claim 1, wherein the protective layer (103) comprises one or more selected from aluminium oxide, and nickel oxide.

* * * * *